United States Patent
Nguyen et al.

(10) Patent No.: US 11,654,499 B1
(45) Date of Patent: May 23, 2023

(54) HAND PIECE FOR TIP AND CARTRIDGE AND METHOD OF USE

(71) Applicant: OK International, Inc., Cyprus, CA (US)

(72) Inventors: Hoa Dinh Nguyen, Santa Ana, CA (US); Michael Carlomagno, Aliso Viejo, CA (US)

(73) Assignee: OK International, Inc., Cypress, CA (US)

( * ) Notice: Subject to any disclaimer, the term of this patent is extended or adjusted under 35 U.S.C. 154(b) by 0 days.

(21) Appl. No.: 17/718,809

(22) Filed: Apr. 12, 2022

Related U.S. Application Data

(60) Provisional application No. 63/191,520, filed on May 21, 2021.

(51) Int. Cl.
*B23K 3/00* (2006.01)
*B23K 3/03* (2006.01)
*B23K 3/02* (2006.01)

(52) U.S. Cl.
CPC .............. *B23K 3/0369* (2013.01); *B23K 3/02* (2013.01); *B23K 3/026* (2013.01)

(58) Field of Classification Search
CPC ............................................ B23K 3/02–0392
USPC ...................................................... 228/51–54
See application file for complete search history.

(56) References Cited

U.S. PATENT DOCUMENTS

| | | | | |
|---|---|---|---|---|
| 4,074,110 A * | 2/1978 | Slaughter | ................. | H05B 3/00 219/229 |
| 4,839,501 A * | 6/1989 | Cowell | ................ | B23K 3/0361 219/229 |
| 6,710,304 B2 * | 3/2004 | Yokoo | ................. | B23K 3/0346 228/55 |
| 2003/0189081 A1 * | 10/2003 | Dunham | .............. | B23K 3/0315 228/55 |
| 2004/0195228 A1 * | 10/2004 | Konishi | ................. | B23K 1/012 219/229 |
| 2005/0092729 A1 * | 5/2005 | Konishi | ................... | B23K 3/03 219/229 |
| 2019/0299312 A1 * | 10/2019 | Axinte | ................. | B23K 3/0307 |
| 2020/0130085 A1 * | 4/2020 | Miyazaki | ............... | B23K 3/033 |

FOREIGN PATENT DOCUMENTS

| | | | | |
|---|---|---|---|---|
| CA | 2201322 A1 * | 4/1996 | | |
| EP | 0145248 A1 * | 6/1985 | | |
| EP | 0386948 A1 * | 9/1990 | | |
| EP | 0414002 A1 * | 2/1991 | | |
| EP | 1616653 A1 * | 1/2006 | ........... | B23K 3/0323 |
| EP | 3666439 A1 * | 6/2020 | ........... | B23K 1/0016 |
| JP | 57039073 A * | 3/1982 | | |
| JP | 2013220477 A * | 10/2013 | ............... | B23K 3/02 |
| KR | 20070109627 A * | 11/2007 | | |
| KR | 20100011365 A * | 2/2010 | | |
| KR | 20120111564 A * | 10/2012 | | |
| KR | 20120125812 A * | 11/2012 | | |
| KR | 20130076956 A * | 7/2013 | | |
| TW | 200911441 A * | 3/2009 | ............. | B23K 3/026 |
| WO | WO-2005118197 A1 * | 12/2005 | ........... | B23K 3/0315 |

* cited by examiner

*Primary Examiner* — Kiley S Stoner

(74) *Attorney, Agent, or Firm* — Procopio Cory Hargreaves and Savitch LLP

(57) ABSTRACT

A soldering iron hand piece that may be used for both a soldering tip and a soldering cartridge, allowing the same hand piece to be used for both a soldering tip and a soldering cartridge.

5 Claims, 3 Drawing Sheets

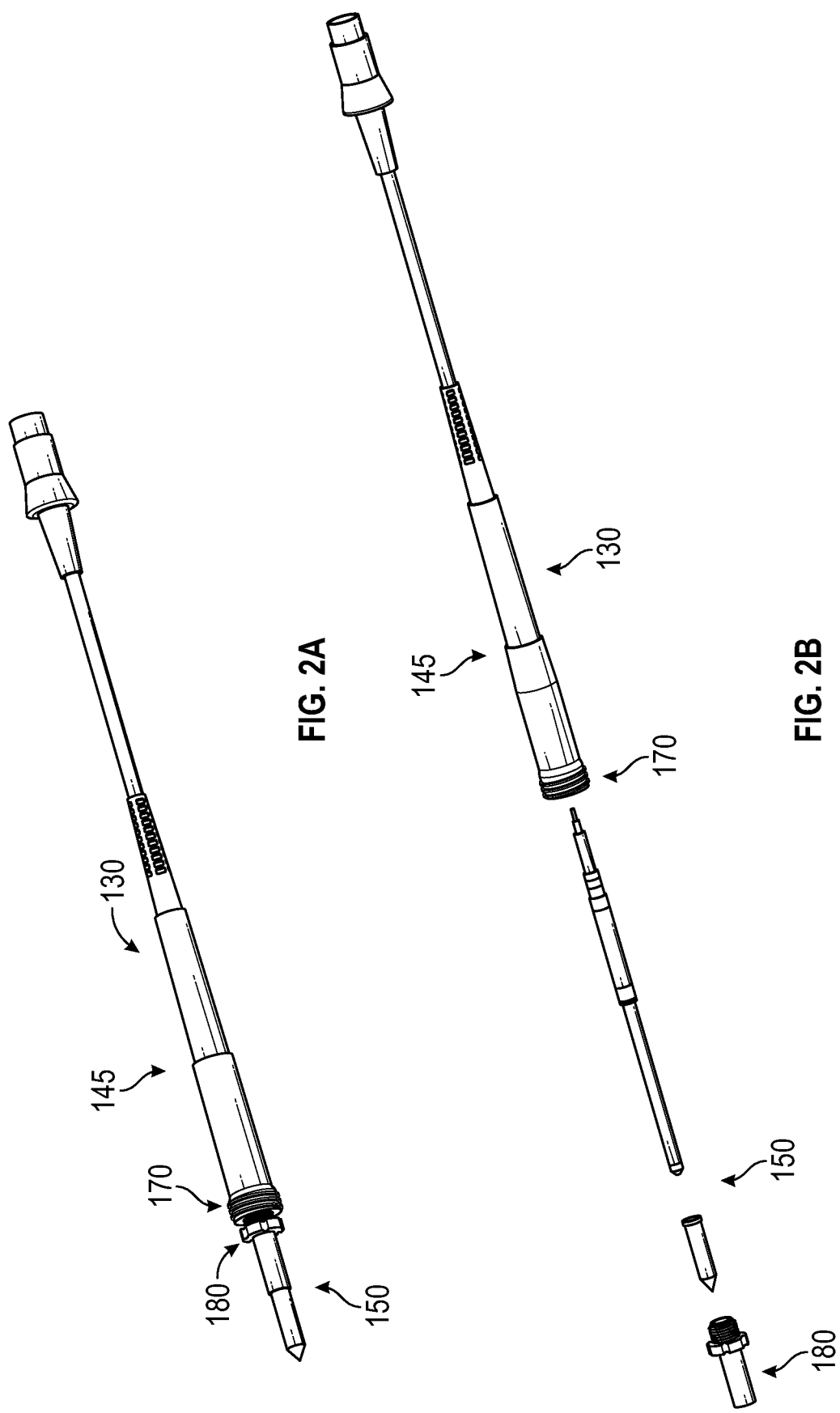

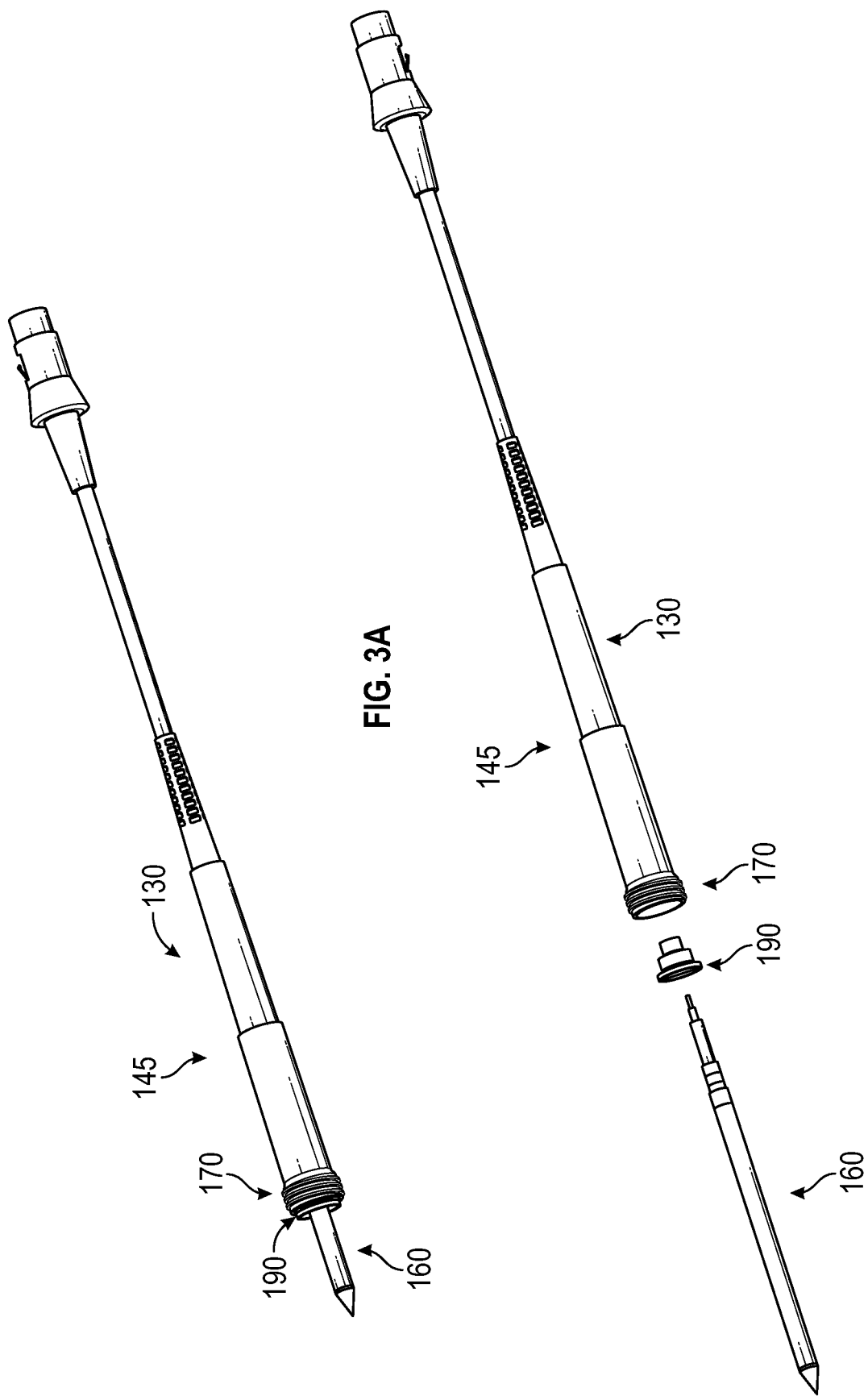

HAND PIECE FOR TIP AND CARTRIDGE AND METHOD OF USE

FIELD OF THE INVENTION

The disclosed invention relates generally to manufacturing, repair and rework of printed circuit boards (PCBs) using soldering, and more particularly to a soldering iron hand piece.

SUMMARY OF THE INVENTION

An aspect involves a soldering iron hand piece that may be used for both a soldering tip and a soldering cartridge. The same hand piece can be used for both a soldering tip and a soldering cartridge. Compared to the soldering tip, the soldering cartridge has a much higher thermal performance and is more expensive. The soldering tip is much less expensive, but can only be used for low/mid load size. For a soldering application that requires a mix of low, mid, and high thermal demand, an operator can simply unplug the soldering tip and plug in the soldering cartridge (or vice versa), as needed.

A soldering iron hand piece of a soldering iron system including a power supply to supply power to the soldering iron hand piece to perform a soldering operation, comprising a housing; an end portion; a coupler at the end portion; a soldering tip configured to be coupled to the end portion of the soldering iron hand piece via the coupler, the soldering tip configured to be used at a first thermal demand; a soldering cartridge configured to be coupled to the end portion of a same soldering iron hand piece via the coupler as the soldering iron hand piece used with the soldering tip, the soldering cartridge configured to be used at a second thermal demand, which is a different than the first thermal demand of the soldering application; wherein the same soldering hand piece is configured to be used with the soldering tip at the first thermal demand and the soldering cartridge at the different second thermal demand.

A further aspect involves a method of using the soldering iron hand piece of the aspect described immediately above, comprising coupling the soldering tip to the end portion of the soldering iron hand piece via the coupler; performing a soldering operation using the soldering tip at the first thermal demand; uncoupling the soldering tip from the end portion of the soldering iron hand piece via the coupler; coupling the soldering cartridge to the end portion of the same soldering iron hand piece previously used with the soldering tip via the coupler; performing a soldering operation using the soldering cartridge at the different second thermal demand.

A still further aspect involves a method of using the soldering iron hand piece of the aspect described immediately above, comprising coupling the soldering cartridge to the end portion of the soldering iron hand piece via the coupler; performing a soldering operation using the soldering cartridge at the second thermal demand; uncoupling the soldering cartridge from the end portion of the soldering iron hand piece via the coupler; coupling the soldering tip to the end portion of the same soldering iron hand piece previously used with the soldering cartridge via the coupler; performing a soldering operation using the soldering tip at the different first thermal demand.

BRIEF DESCRIPTION OF DRAWINGS

FIG. 2A is a perspective view of the soldering iron hand piece of FIG. 1 shown with the soldering tip shown plugged into the soldering iron hand piece.

FIG. 2B is a perspective view of the soldering iron hand piece of FIG. 1 shown with an exploded view of the soldering tip shown unplugged from the soldering iron hand piece.

FIG. 3A is a perspective view of the soldering iron hand piece of FIG. 1 shown with the soldering cartridge shown plugged into the soldering iron hand piece.

FIG. 3B is a perspective view of the soldering iron hand piece of FIG. 1 shown with an exploded view of the soldering cartridge shown unplugged from the soldering iron hand piece.

DETAILED DESCRIPTION OF THE INVENTION

Figure 1:
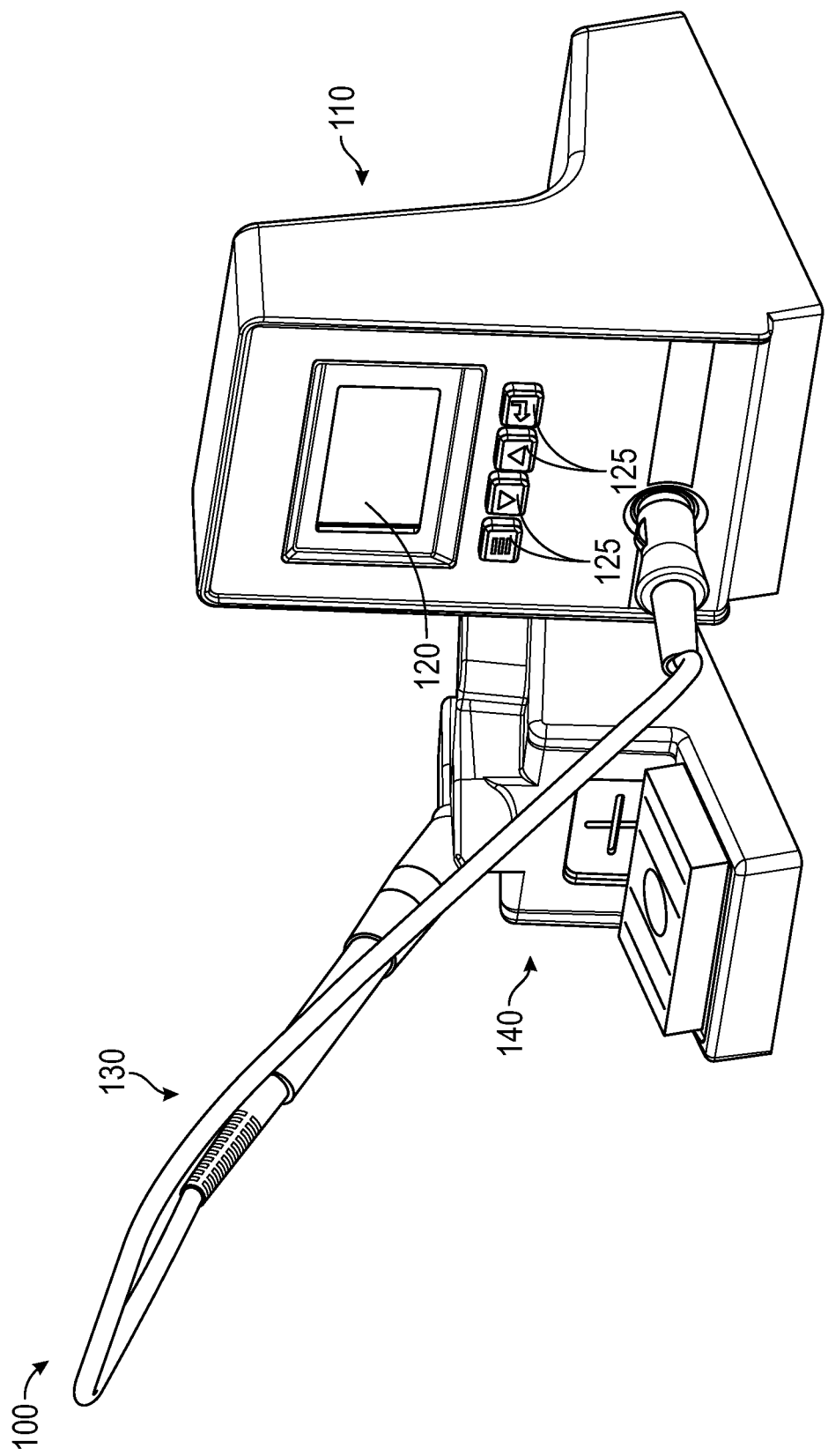
FIG. 1 depicts an embodiment of a handheld soldering iron system with a soldering iron hand piece that may be used for both a soldering tip and a soldering cartridge.

With reference to FIGS. 1-3B, an embodiment of a handheld soldering iron system 100 with a soldering iron hand piece 130 that may be used for both a soldering tip 150 and a soldering cartridge 160.

The handheld soldering iron system includes a power supply unit 110 including a display 120 such as an LCD display, and various inputs 125. The soldering iron system 100 further includes the hand piece 130 coupled to the power supply unit 110 and a (work) stand 140 that accommodates the hand piece 130. The hand piece 130 includes a housing or shaft 145, and receives power from the power supply unit 110 and heats the soldering tip 150 or the soldering cartridge 160, depending on which is plugged into the same hand piece 130 to perform the soldering on a work piece.

With reference to FIGS. 2A and 2B, the soldering tip 150 may be plugged into and coupled to an end portion 170 of the soldering iron hand piece 130 with a coupler 180.

With reference to FIGS. 3A and 3B, the soldering cartridge 160 may be plugged into and coupled to the end portion 170 of the same soldering iron hand piece 130 with a coupler 190.

Therefore, the soldering iron hand piece 130 may be used for both the soldering tip 150 and the soldering cartridge 160. For a soldering application that requires a mix of low, mid, and/or high thermal demand, an operator can simply unplug/uncouple the soldering tip 150 from the end portion 170 of the same soldering iron hand piece 130 and plug in/couple the soldering cartridge 160 of the end portion 170 of the same soldering iron hand piece 130. Additionally or alternatively, the operator can simply unplug/uncouple the soldering cartridge 160 from the end portion 170 of the same soldering iron hand piece 130 and plug in/couple the soldering tip 150 to the end portion 170 the end portion 170 of the same soldering iron hand piece 130.

The above figures may depict exemplary configurations for the invention, which is done to aid in understanding the features and functionality that can be included in the invention. The invention is not restricted to the illustrated architectures or configurations, but can be implemented using a variety of alternative architectures and configurations. Additionally, although the invention is described above in terms of various exemplary embodiments and implementations, it should be understood that the various features and functionality described in one or more of the individual embodiments with which they are described, but instead can be applied, alone or in some combination, to one or more of the other embodiments of the invention, whether or not such embodiments are described and whether or not such features are presented as being a part of a described embodiment.

Thus the breadth and scope of the present invention, especially in the following claims, should not be limited by any of the above-described exemplary embodiments.

Terms and phrases used in this document, and variations thereof, unless otherwise expressly stated, should be construed as open ended as opposed to limiting. As examples of the foregoing: the term "including" should be read as mean "including, without limitation" or the like; the term "example" is used to provide exemplary instances of the item in discussion, not an exhaustive or limiting list thereof; and adjectives such as "conventional," "traditional," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although item, elements or components of the disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent.

The invention claimed is:

1. A soldering iron hand piece kit of a soldering iron system including a power supply to supply power to the soldering iron hand piece to perform a soldering operation, comprising:
   a soldering iron hand piece comprising:
      a housing;
      an end portion;
   a soldering tip coupler;
   a soldering cartridge coupler, which is different than the soldering tip coupler;
   a soldering tip configured to be coupled to the end portion of the soldering iron hand piece via the soldering tip coupler, the soldering tip configured to be used at a first thermal demand;
   a soldering cartridge configured to be coupled to the end portion of a same soldering iron hand piece via the soldering cartridge coupler as the soldering iron hand piece used with the soldering tip, the soldering cartridge configured to be used at a second thermal demand, which is a different than the first thermal demand of the soldering application;
   wherein the same soldering hand piece is configured to be used with the soldering tip via the soldering tip coupler at the first thermal demand and the soldering cartridge via the soldering cartridge coupler at the different second thermal demand.

2. A method of using the soldering iron hand piece kit of claim 1, comprising:
   coupling the soldering tip to the end portion of the soldering iron hand piece via the soldering tip coupler;
   performing a soldering operation using the soldering tip at the first thermal demand;
   uncoupling the soldering tip from the end portion of the soldering iron hand piece via the soldering tip coupler;
   coupling the soldering cartridge to the end portion of the same soldering iron hand piece previously used with the soldering tip via the soldering cartridge coupler;
   performing a soldering operation using the soldering cartridge at the different second thermal demand.

3. A method of using the soldering iron hand piece kit of claim 1, comprising:
   coupling the soldering cartridge to the end portion of the soldering iron hand piece via the soldering cartridge coupler;
   performing a soldering operation using the soldering cartridge at the second thermal demand;
   uncoupling the soldering cartridge from the end portion of the soldering iron hand piece via the soldering cartridge coupler;
   coupling the soldering tip to the end portion of the same soldering iron hand piece previously used with the soldering cartridge via the soldering tip coupler;
   performing a soldering operation using the soldering tip at the different first thermal demand.

4. A method of using the soldering iron hand piece kit of claim 1, wherein the soldering tip is a multiple-piece component.

5. A method of using the soldering iron hand piece kit of claim 1, wherein the soldering cartridge is a single-piece component.

* * * * *